June 13, 1950      G. H. VAN BRUNT      2,511,519
MOUSETRAP
Filed Sept. 2, 1947
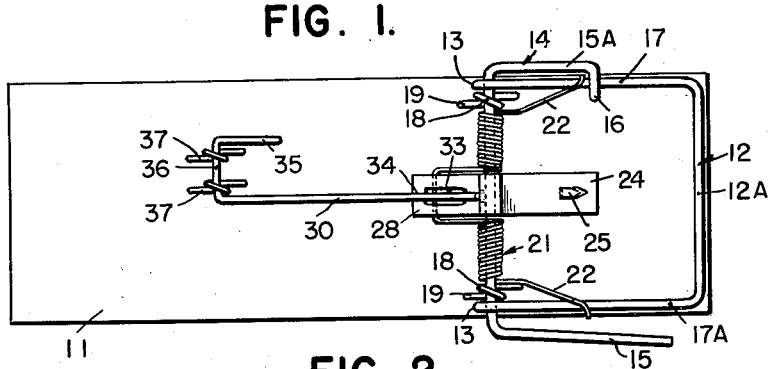
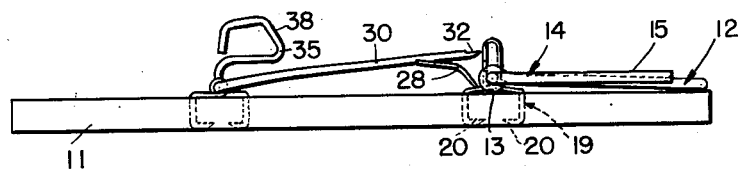
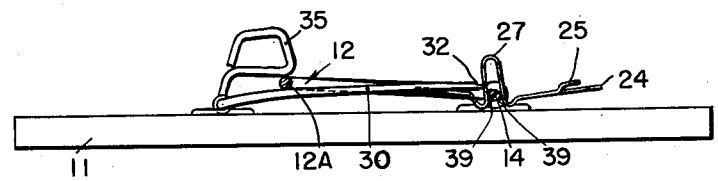
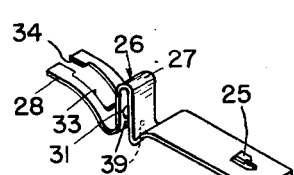 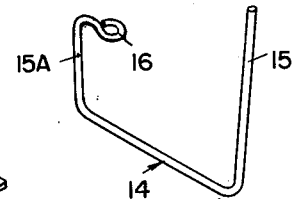 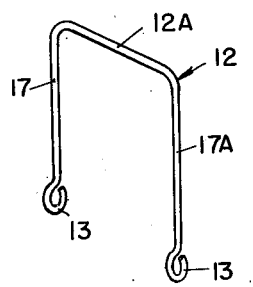
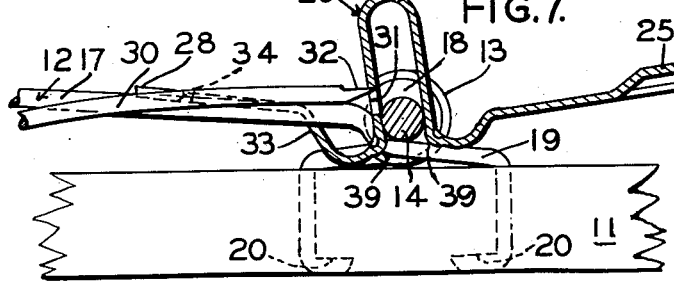
INVENTOR
GEORGE H. VAN BRUNT
BY
ATTORNEY Patented June 13, 1950

2,511,519

UNITED STATES PATENT OFFICE 2,511,519

MOUSETRAP

George H. Van Brunt, Los Angeles, Calif.

Application September 2, 1947, Serial No. 771,735

4 Claims. (Cl. 43—83)

This invention relates to mouse traps and in particular to a self-setting trap of the spring-actuated swinging striker type.

One object of the invention is to provide a mouse trap which eliminates all necessity on the part of the user to put his hands in a position of danger while setting the trap. Another object is to provide an improved self-setting trigger mechanism. Still another object is to provide a mouse trap which is automatically set by the action of swinging the spring jaw into full open position, this action resulting in a cooperative engagement between the jaw locking bar and the trigger carried on the bait holder pedal. A further object is to provide a self-setting mouse trap which is certain in its action and simple and economical to manufacture.

These and other objects are attained by my invention which will be understood from the following description, reference being made to the accompanying drawings in which:

Fig. 1 is a top plan view showing my improved mouse trap, in sprung condition;

Fig. 2 is a side elevational view of the same;

Fig. 3 is a side elevational view of the trap in set condition;

Fig. 4 is a perspective view of the bait holder pedal and trigger;

Fig. 5 is a perspective view of the handle and pivot bar;

Fig. 6 is a perspective view of the jaw member; and

Figure 7 is an enlarged side elevational view of a portion of Figure 3.

Referring to the drawings, a base member 11 is provided, being generally rectangular in shape, made of wood or other material sufficiently strong to provide a rigid support for the trap mechanism. At one end of the base is mounted the jaw 12 consisting of a strong piece of wire bent into a square U shape with eyelets 13 at the two ends of the wire adapted to fasten around the wire pivot bar 14, which has a handle 15 turned at right angles to the pivot bar 14 at one end and a right angled attachment bar 15A at the other end, with a loop 16 adapted to engage the side 17 of the jaw member 12. The pivot bar 14 is mounted in loops 18 of wire staples 19 which are fastened through the wood base 11 and the protruding ends 20 bent over and pressed against the underside of the base 11. A divided coil spring member 21 has its two wire ends 22 engaging the sides 17 and 17A of the jaw 12 to press the jaw against the base 11. The trigger and bait holder pedal element is preferably made integral from a single strip of metal, the bait holder pedal portion 24 having a bait holding prong or tongue 25. The trigger portion 26 consists of an upwardly extending return bend 27 formed from the strip of metal whose one free end, in a generally horizontal position, constitutes the bait holder portion 24, the other free end of the metal strip, to be later described, constituting the reset holder 28 for the locking bar 30. The return bend open end is mounted astride the bar 14, knobs 39 holding it thereon.

The return bend 27 is provided with a hole 31 in the face opposite the bait holder portion 24, this hole being adapted to engage the pointed end 32 of the locking bar 30. The return bend 27 is also shaped on both walls at a position below the hole 31 to fit on the pivot bar 14 at the center thereof in the space between the two parts of the divided coil spring member 21. The reset holder 28 for the locking bar 30 consists of a curved portion of the metal strip extending upwardly and away from the pivot bar and is provided with a slot 33 disposed longitudinally in a central position and having a throat 34 at the free end of the strip which is constricted to tightly fit over the locking bar 30. The slot 33 and the throat 34 are arranged so that the locking bar may be, with slight pressure, pressed through the throat portion 34 on the downward movement of the locking bar 30 during the resetting, but on the upward movement frictionally engages the edges thereof.

The locking bar 30 extends far enough away from the pivot bar 14 to allow the jaw 12 to be held by the detent 35. The locking bar 30 is provided with a right-angled extension 36 which serves as a pivoting shaft, being held thereby to the base 11 by the loop staples 37. The detent 35 consists of an arm of the wire from the extension 36 directed parallel to the locking bar 30 but slightly above it, and is adapted to hold the cross member 12A of the jaw 12 when the locking bar 30 is engaged at its free pointed end 32 in the hole 31 of the return bend 27. The wire forming the detent 35 is extended upwardly and inclined rearwardly to form a cam surface 38 which is contacted by the cross member 12A of the jaw during the movement of resetting the trap, and serving to rock the locking bar 30 first upwardly to allow the cross bar 12A to go under the detent 35, following which the cross member 12A presses the locking bar downwardly through the slot 33. The cross member 12A is held between the detent 35 and the bar 30 in set condition.

The resetting of the trap is automatic by the swinging of the handle 15 and its attached jaw 12 from the sprung position (shown in Figs. 1 and 2) to the set position shown in Fig. 3. When the cross member 12A strikes the cam surface 38, it first raises and then presses the locking bar 30 toward the base 11, the free end of the locking bar passing through the slot 33 of the reset holder 28. This causes the rocking of the return bend to the position approximately as shown in Fig. 3, in which position the pointed end 32, on its upward movement from the extreme low position, will engage in the hole 31 of the return bend portion 27 of the trigger. To overcome the rocking of the trigger by the bait holding portion 24, which causes the return bend portion to rock away from the pointed end 32 so that it does not engage in the hole 31, the restricted throat 34 is closed slightly to provide friction on the sides of the locking bar 30, thus holding the trigger or return bend 27 in engaging position until the tip or point of the end 32 of the locking bar has contacted the upper edge of the hole 31. Normally the bait holder 24 is overbalanced on the bait holding side so that it will always be in position ready for setting. When the bait is in place this overbalancing is even more pronounced. Therefore, in order to get the locking bar 30 to engage the hole 31 in the return bend before the weight of the bait causes the hole to move out of the way of the locking bar, the friction of the throat 34 stops this movement and the trap is set. In this position, following the downthrust of the locking bar, the cross member 12A of the jaw slips into the detent 35.

The trap is of course sprung by the mouse or other animal when touching the bait on the prong 25 of the bait holder portion 24, which rocks the return bend 27 and releases the pointed end 32 from the hole 31, allowing the locking bar 30 to swing upwardly to release the cross member 12A from the detent 35. The spring 21 actuates the jaw 12 to strike and catch the mouse between the base 11 and the jaw cross bar 12A. The victim is easily removed by opening the jaw with the handle 15. The resetting of the trap consists simply in turning the handle through approximately 180° to reset the trap as above described, the bar 12A pressing the locking bar into position.

The advantages of my improved self-setting mouse trap will be apparent. It is simple in construction and certain in operation. The setting after springing is accomplished merely by moving the handle through a half-turn. The victim may be removed without contact with the hands.

I claim:

1. A mouse trap comprising a base; a jaw member pivotally mounted on said base including spring means for actuating said jaw; a bait pedal and trigger member rockably mounted at the line of pivoting of said jaw, said trigger having means for engaging the end of a locking bar when the trap is set; a locking bar pivotally mounted on the base on the side of the jaw pivot opposite the bait pedal, and adapted to engage the jaw in the trap-set position; and a reset holder having a slot and extending from said bait pedal and trigger member in the path of said locking bar during the reset movement, said holder being depressible by contact with said bar to rock said bait pedal and trigger member into position for engaging the end of said locking bar, said reset holder having a restricted throat at the open end of said slot adapted to hold said trigger in position when the end of said locking bar is about to engage said aperture as the bar moves up from its extreme low position.

2. A mouse trap comprising a base; a pivot shaft mounted on said base, including handle means for turning said shaft; a jaw pivotally mounted on said pivot shaft and adapted to be turned therewith including spring means for actuating said jaw; a bait pedal and trigger member rockably mounted on said pivot shaft, said trigger having an aperture adapted to engage the end of a locking bar when the trap is set; a locking bar pivotally mounted on the base on the side of the jaw pivot opposite the bait pedal, and adapted to engage the jaw in the trap-set position; and a reset holder having a slot and extending from said bait pedal and trigger member in the path of said locking bar during the reset movement, said holder being depressible by contact beyond the inner end of said slot with said bar to rock said bait pedal and trigger member into position for inserting the end of said locking bar in said aperture, said reset holder having a restricted throat at the open end of said slot adapted to hold said trigger in position when the end of said locking bar is about to engage said aperture as the bar moves up from its extreme low position.

3. A mouse trap comprising a base; a pivot shaft mounted on said base, including handle means for turning said shaft; a jaw pivotally mounted on said pivot shaft and adapted to be turned therewith including spring means for actuating said jaw; a bait pedal and trigger member rockably mounted on said pivot shaft, said trigger having an aperture adapted to engage the end of a locking bar when the trap is set; a locking bar including a jaw-engaging detent, said bar being pivoted to said base adjacent the position of the cross-bar of said jaw when in the trap-set position; and a reset holder having a slot and extending from said bait pedal and trigger member in the path of said locking bar during the reset movement, said holder being depressible by contact beyond the inner end of said slot with said bar to rock said bait pedal and trigger member into position for inserting the end of said locking bar in said aperture, said reset holder having a restricted throat at the open end of said slot adapted to hold said trigger in position when the end of said locking bar is about to engage said aperture as the bar moves up from its extreme low position.

4. A mouse trap comprising a base; a pivot shaft mounted on said base, including handle means for turning said shaft; a jaw pivotally mounted on said pivot shaft and adapted to be turned therewith including spring means for actuating said jaw; a bait pedal and trigger member rockably mounted on said pivot shaft, said trigger having an aperture adapted to engage the end of a locking bar when the trap is set; a locking bar including a cam member adapted to be pressed by said jaw upon resetting to press said locking bar downwardly, and also including a jaw-engaging detent, said bar being pivoted to said base adjacent the position of the cross-bar of said jaw when in trap-set position; and a reset holder having a slot and extending from said bait pedal and trigger member in the path of said locking bar during the reset movement, said holder being depressible by contact beyond the inner end of said slot with said bar to rock said bait pedal and trigger member into position for inserting the end of said locking bar in said aperture, said reset holder having a restricted throat at the open end of said slot adapted to hold said trigger in position when the end of said locking bar is about to engage said aperture as the bar moves up from its extreme low position.

GEORGE H. VAN BRUNT.

No references cited.